United States Patent
Wu et al.

(10) Patent No.: US 10,806,125 B1
(45) Date of Patent: Oct. 20, 2020

(54) SERVICE ANIMAL NAVIGATION

(71) Applicant: INTERNATIONAL BUSINESS MACHINES CORPORATION, Armonk, NY (US)

(72) Inventors: Jiawei Wu, Austin, TX (US); Shunguo Yan, Austin, TX (US); Brent Shiver, Austin, TX (US); Thomas Andrew Brunet, Round Rock, TX (US); Ali Ishaq Unwala, Pflugerville, TX (US); Alberto Fung, Missouri City, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/539,155

(22) Filed: Aug. 13, 2019

(51) Int. Cl.
| | |
|---|---|
| *A61H 3/06* | (2006.01) |
| *A01K 15/02* | (2006.01) |
| *G01C 21/36* | (2006.01) |
| *A01K 29/00* | (2006.01) |

(52) U.S. Cl.
CPC .......... *A01K 15/021* (2013.01); *A01K 29/005* (2013.01); *A61H 3/061* (2013.01); *G01C 21/3605* (2013.01); *A61H 2003/063* (2013.01)

(58) Field of Classification Search
CPC .. A01K 15/021; A01K 29/005; A01K 27/009; A01K 29/00; A61H 3/061; A61H 3/06; A61H 3/063; G01C 21/3605; G01C 21/005; G01C 21/00; G08B 1/08; G08B 23/00
USPC ..... 340/539.11, 539.13, 573.2, 573.3, 573.7, 340/686.1
See application file for complete search history.

(56) References Cited

U.S. PATENT DOCUMENTS

| | | | |
|---|---|---|---|
| 5,791,294 A | 8/1998 | Manning | |
| 6,874,447 B1 | 4/2005 | Kobett | |
| 7,602,302 B2* | 10/2009 | Hokuf | A01K 11/008 340/539.13 |
| 9,258,982 B1 | 2/2016 | Golden | |
| 9,449,487 B1* | 9/2016 | Spitalny | A01K 15/023 |
| 9,456,584 B2* | 10/2016 | McLaughlin | A01K 11/008 |

(Continued)

OTHER PUBLICATIONS

Allen, "Garmin PRO 550 Plus Training and Tracking Bundle," https://www.rayallen.com/garmin-pro-550-plus-training-and-tracking-bundle. [Accessed Mar. 14, 2019], pp. 1-2.

(Continued)

*Primary Examiner* — Hung T Nguyen
(74) *Attorney, Agent, or Firm* — Samuel A. Waldbaum

(57) ABSTRACT

The method, computer program product and computer system may include computing device which may create a user profile based on user data associated with a user and animal data associated with the user's service animal. The computing device may receive a destination input and determine one or more routes to the input destination, the one or more routes each being associated with a set of route commands. The computing device may receive a route selection and translate the set of route commands associated with the selected route into a set of service animal command signals. The computing device may transmit a first service animal command signal from the set of service animal command signals to a signal device, the signal device being attached to the user's service animal and generate an output by the signal device corresponding with the first service animal command signal.

20 Claims, 7 Drawing Sheets

(56) References Cited

U.S. PATENT DOCUMENTS

| | | |
|---|---|---|
| 9,693,536 B1* | 7/2017 | Dana .................... A01K 15/023 |
| 2002/0046713 A1 | 4/2002 | Otto |
| 2017/0135315 A1 | 5/2017 | Marmen |
| 2017/0238509 A1 | 8/2017 | Dayal |
| 2018/0184618 A1* | 7/2018 | Gotts .................... H04W 4/021 |

OTHER PUBLICATIONS

Bryne et al., "A method to evaluate haptic interfaces for working dogs," International Journal of Human-Computer Studies, vol. 98, Feb. 2017, pp. 196-207.

IBM, "Seeing eye dog equipped with GPS," IP.com Disclosure No. IPCOM000133836D, Original Publication Date: Feb. 10, 2006, pp. 1-2.

Mell et al., "The NIST Definition of Cloud Computing", National Institute of Standards and Technology, Special Publication 800-145, Sep. 2011, 7 pages.

PBS, "Talking to dogs isn't so far-fetched: Researchers translate canine with computer science," Dec. 9, 2014 [Accessed Mar. 14, 2019] https://www.pbs.org/newshour/show/talking-dogs-isnt-far-fetched-researchers-translate-canine-computer-science, pp. 1-6.

* cited by examiner

SERVICE ANIMAL NAVIGATION

BACKGROUND

The present invention relates generally to a method, system, and computer program for navigation. More particularly, the present invention relates to a method, system, and computer program for service animal navigation.

GPS has become a near ubiquitous technology used on a variety of devices such as smartphones, cars, and as stand-alone devices. GPS devices allow users to orient themselves and to plan out travel routes. GPS is a satellite-based radio navigation system that provides geolocation and time information to a GPS receiver anywhere on or near the Earth where there is an unobstructed line of sight to GPS satellites. GPS does not require a user to transmit any data, and it operates independently of any telephonic or internet reception, though these technologies can enhance the usefulness of the GPS positioning information. The GPS provides critical positioning capabilities to military, civil, and commercial users around the world. In addition to GPS, there are other navigation systems with similar capabilities such as the Russian Global Navigation Satellite System (GLONASS), China's BeiDou Navigation Satellite System, the European Union's Galileo positioning system, India's NAVIC, and Japan's Quasi-Zenith Satellite System.

BRIEF SUMMARY

An embodiment of the invention may include a method, computer program product and computer system for service animal navigation. The method, computer program product and computer system may include computing device which may create a user profile based on user data associated with a user and animal data associated with the user's service animal. The computing device may receive a destination input and determine one or more routes to the input destination, the one or more routes each being associated with a set of route commands. The computing device may receive a route selection and translate the set of route commands associated with the selected route into a set of service animal command signals. The computing device may transmit a first service animal command signal from the set of service animal command signals to a signal device, the signal device being attached to the user's service animal and generate an output by the signal device corresponding with the first service animal command signal. The computing device may determine service animal compliance with the first service animal command signal and in response to detecting non-compliance by the service animal with the first service animal command signal, alert the user of the non-compliance by the service animal with the first service animal command signal. The computing device may receive a reinforcement command signal from the user for the first service animal command signal from a signal control device and transmit the reinforcement command signal to the signal device for output to the service animal. The computing device may determine a cause of the service animal non-compliance and in response to determining a valid cause for the non-compliance of the service animal the computing device may determine a new route to the input destination.

DETAILED DESCRIPTION

Figure 1A:
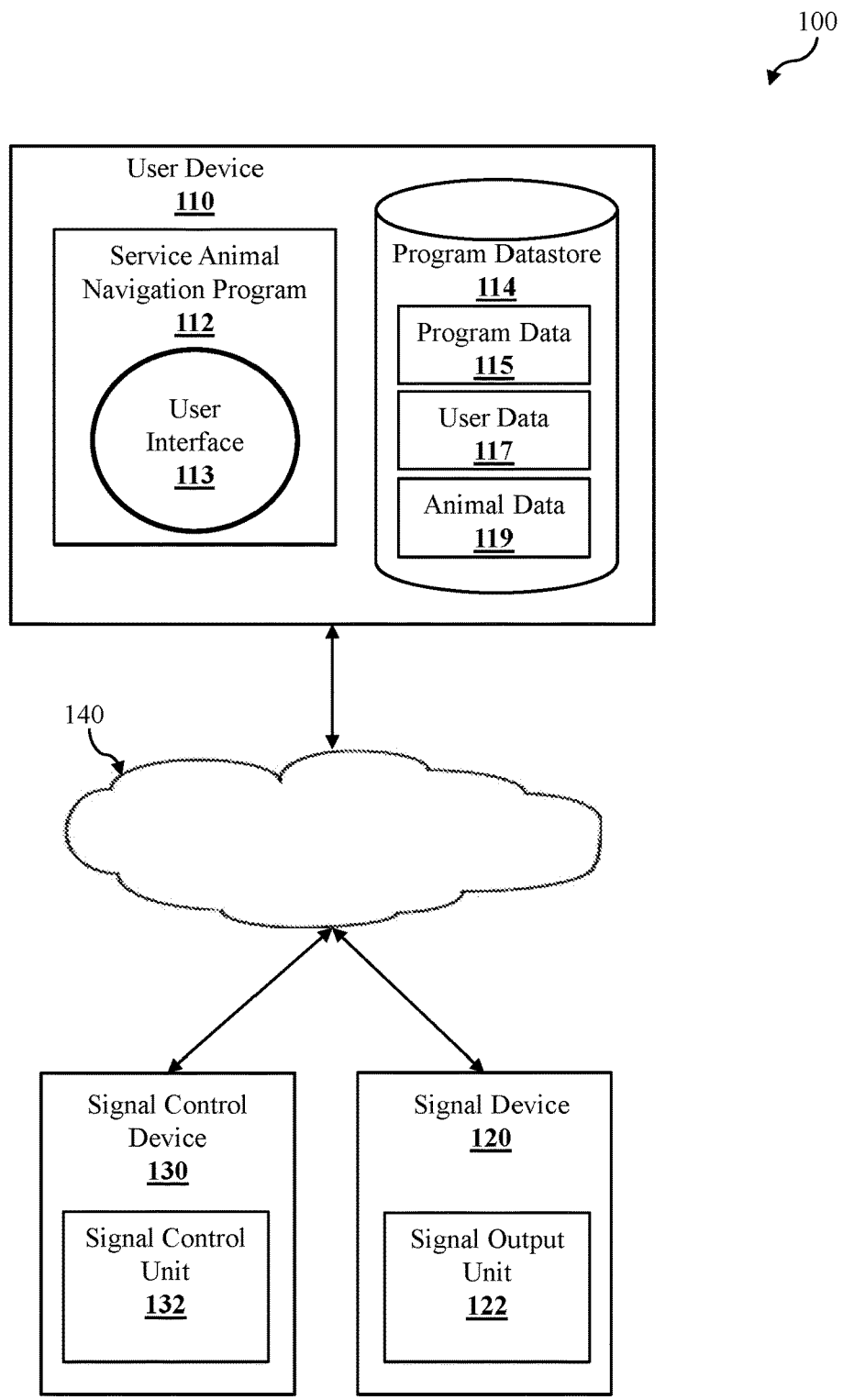
FIG. 1a illustrates a system for service animal navigation, in accordance with an embodiment of the invention.

Embodiments of the present invention will now be described in detail with reference to the accompanying Figures.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention provide a method, computer program, and computer system for service animal navigation. Currently, people using navigation systems in conjunction with a guide animal must physically convey the directions to the guide animal themselves. In a noisy environment, audible commands may not be heard. A person using a guide animal may be unaware of that they are at a location where a direction change is required and, as a result, fail to provide a needed command. Embodiments of the present invention allow for the translation of route directions from a navigation system into signals which are transmitted to a signaling device attached to a guide animal. The signals may be programmed to be signals the guide animal has learned in training such as sounds or vibrations and may vary in intensity to indicate the distance until an action must be taken. Embodiments of the present invention also provide a signal controller which allows the person to override a guide animal's non-compliance with a navigational command and to reinforce the navigational command signal. Further embodiments of the present invention may allow for the provision, filtering out, or changing the strengths of remote navigational commands to an animal. Thus, embodiments of the present invention improve current systems by allowing a navigation system to directly send navigational commands to a guide animal without the need for signaling from a human handler. Further, embodiments of the present invention will empower handicapped users, such as visually impaired or non-verbal persons, to convey navigational commands to their guide animal with a high degree of confidence.

Reference will now be made in detail to the embodiments of the present invention, examples of which are illustrated in the accompanying drawings, wherein like reference numerals refer to like elements throughout. Embodiments of the invention are generally directed to a system for service animal navigation.

FIG. 1 illustrates a service animal navigation system 100, in accordance with an embodiment of the invention. In an example embodiment, service animal navigation system 100 may include user device 110, signal device 120, and signal control device 130, interconnected via network 140.

In general, the network 140 can be any combination of connections and protocols that will support communications between the user device 110, signal device 120, and signal control device 130. The network 140 may include, for example, wired, wireless or fiber optic connections. In an example embodiment, the network 140 may be a wired or wireless personal area network (PAN). In another example embodiment, the network 140 may be the Internet, representing a worldwide collection of networks and gateways to support communications between devices connected to the Internet. In other embodiments, the network 140 may be implemented as an intranet, a local area network (LAN), or a wide area network (WAN).

The user device 110 may include service animal navigation program 112, and program datastore 114. In the example embodiment, the computer device 110 may be a navigational device, such as, but not limited to, a global positioning system (GPS) device, a cellphone, a desktop computer, a notebook, a laptop computer, a tablet computer, a thin client, or any other navigational device, electronic device or computing system capable of storing compiling and organizing audio, visual, or textual content and receiving and sending that content to and from other computing devices, such as the signal device 120, and the signal control device 130 via the network 140. In various embodiments, the user device is equipped with hardware, software, or both hardware and software that enables the location of the user device to be determined, e.g., a GPS device, an indoor positioning system (IPS) device, or both types of devices. According to various embodiments, an IPS may use any known technology. As one example technology, an IPS may employ distance measurement to nearby anchor nodes (nodes with known fixed positions, e.g. WiFi/LiFi access points or Bluetooth beacons). Other examples include magnetic positioning and dead reckoning. In a pedestrian dead reckoning system, an inertial measurement unit in the user device may either measure steps indirectly (step counting) or the user device may incorporate foot mounted sensors. In an embodiment, an (IPS) device may include a camera and image recognition software for identifying a visual marker that corresponds with particular location. While the present description refers to IPS technology, it should be understood that use of a user device equipped with IPS technology is restricted to indoor use. IPS technology may be used in any suitable environment. The user device 110 is described in more detail with reference to FIG. 4. While only a single user device 110 is illustrated, it can be appreciated that any number of user devices 110 may be part of the service animal navigation system 100.

The service animal navigation program 112 may include a user interface 113. The service animal navigation program 112 is a program capable of determining a navigational route with associated navigational route commands, translating the navigational route commands into service animal command signals and transmitting the service animal command signals to the signal device 120. The service animal navigation program 112 is described in more detail below with reference to FIG. 1b.

The user interface 113 includes components used to receive input from a user on the user device 110 and transmit the input to the service animal navigation program 112, or conversely to receive information from the service animal navigation program 112 and display the information to the user on the user device 110. The user interface 113 may include components that receive audio and play sounds, such as a microphone, a speaker, or a headset having a microphone and a speaker. In an example embodiment, the user interface 113 uses a combination of technologies and devices, such as device drivers, to provide a platform to enable users of user device 110 to interact with the service animal navigation program 112. In the example embodiment, user interface 113 receives input, such as textual or audio input received from a physical input device, such as a keyboard or a microphone.

The program datastore 114 may include program data 115, user data 117, and animal data 119. The program datastore 114 may be any storage media capable of storing and managing data, such as, but not limited to, storage media resident in the user device 110 and/or removeable storage media. For example, the program datastore 114 may be, but is not limited to, a hard drive, a solid stated drive, a USB drive, or a memory card, etc. The program data 115, the user data 117, and the animal data 119 may include, but is not limited to, audio, visual, and textual data. The program data 115 may be a collection of navigational data used by the service animal navigation program 112 to determine navigational routes and directions, such as, but not limited to, map data, destination data, traffic data, points-of-interest data, saved user destinations, previously entered user destinations, etc. The user data 117 may be a collection of user specific data, such as, but not limited to, user identification data, user navigation preferences, user service animal identification data, user signal device identification data, saved user destinations, and previously entered user destinations, etc. The animal data 119 may be a collection of animal specific data associated with user identified service animals such as, but not limited to, service animal identification data, service animal command preferences, and identification data for signal devices associated with the service animal, etc. The service animal command preferences may include, but are not limited to, sound commands such as word commands, tones or other audio signals, and vibration commands, etc. The program datastore 114 located on the user device 110 may be accessed through the network 140. The program datastore 114 is described in more detail with reference to FIG. 4.

The signal device 120 may include signal output unit 122. The signal device 120 may be any device capable of receiving route command signals from other computing devices such as, the user device 110, and the signal control device 130, via the network 140 and transmitting the route command signals to a service animal via the signal output unit 122. For example, the signal device 120 may be, but not limited to, a haptics device, a sound device, a pressure device, a vibration device, or any other signal output device capable of receiving route command signals from other computing devices such as, the user device 110 and the signal control device 130, and transmitting the route command signals to a service animal via the signal output unit 122. The signal device 120 may be attached to or otherwise incorporated within for example, but not limited to, a leash, a collar, a vest, a harness, etc. The signal output unit 122 may be any device capable of outputting the route command signals received by the signal device 120 such as, but not limited to, a vibration sensor, or a speaker, etc.

The signal control device 130 may include signal control unit 132. The signal control device 130 may be any device capable of receiving navigational command signals from other computing devices such as, the user device 110 via the network 140 or from physical user input, translating the navigational commands and transmitting the navigational command signals to the signal device 120 via the network 140. For example, the signal control device 130 may be, but not limited to, a button, a handle, a lever, a trigger, or any other signal control device capable of receiving navigational command signals from other computing devices such as, the user device 110 via the network 140 or from physical user input, and transmitting the navigational command signals to the signal device 120. In embodiments of the invention, the signal control device 130 may be used by a user of the service animal navigation system 100 to reinforce a navigational command signal when the service animal navigation program 112 detects that the service animal has not complied with a navigational command signal. Navigational command signal reinforcement is described in more detail below with reference to FIG. 1b. While the signal control device 130 is illustrated as being a separate device from the signal device 120, it can be appreciated that the signal control device 130 may be a part of, attached to, or otherwise associated with the signal device 120. For example, the signal control device 120 may be a button attached to the handle of a leash.

Figure 1B:
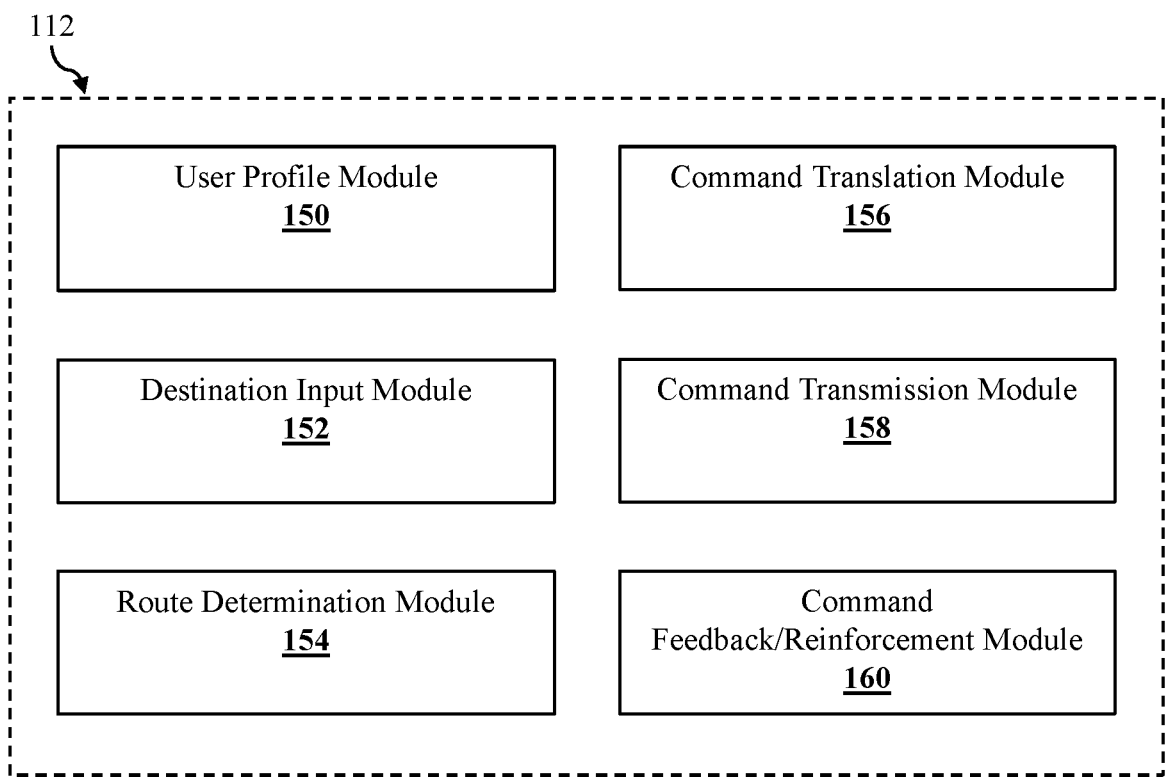
FIG. 1b illustrates example operating modules of the service animal navigation program of FIG. 1a, in accordance with an embodiment of the invention.

Referring to FIG. 1b, example modules of the service animal navigation program 112 are illustrated. In an example embodiment, the service animal navigation program 112 may include six modules: the user profile module 150, the destination input module 152, the route determination module 154, the command translation module 156, the command transmission module 158, and the command feedback/reinforcement module 160.

The user profile module 150 receives the user data 117 and the animal data 119 associated with a user and a user's service animal. The user profile module 150 creates a user profile based on the user data 117 and animal data 119 and stores the user profile on the program datastore 114. The user profile may include, but is not limited to, user identification data, user disability types and severities, user navigation preferences, user service animal identification data, user signal device identification data, saved user destinations, and previously entered user destinations, service animal identification data, service animal command preferences, and identification data for signal devices associated with the service animal, etc. For example, the user profile for a user "X" may include user X's home address, work address, and other frequented destinations along with the identification of user X's service animal and user X's service animal's command preferences such as, but not limited to, sounds or vibrations, etc.

The destination input module 152 receives a destination from a user using the user device 110. A user may enter a destination via the user interface 113 on the user device 110. In one embodiment of the invention, a user may enter a specific destination such as, but not limited to, an address, a postal code, coordinates, i.e. longitude and latitude, or a place name, e.g. a hotel name or a landmark, etc. Further, the destination may be a saved route, stored in the program datastore 114.

The route determination module 154 determines one or more routes to the received destination utilizing the program data 115 stored on the program datastore 114 and a current location determined by one or more components of the user device that enable the location of the user device to be determined. The one or more routes may include one or more route commands, i.e. directions. The route determination module 154 may determine one or more routes to the received destination optimizing routes based on the user data 117 and the animal data 119. For example, the route determination module 154 may determine a route based on a user's disability and any requirements associated with the user's disability such as, but not limited to, wheelchair access, limited mobility, sound and sight requirements for the deaf and hard of hearing, and sound and touch requirements for the blind, etc. The user may select a route using the user interface 113 on the user device 110.

The command translation module 156 translates the route commands associated with the selected route into service animal command signals. The command translation module 156 translates the route commands based on the animal command preferences contained in the animal data 119 stored on the program datastore 114. For example, the animal data 119 may contain the service animal commands signals that the service animal has been trained to understand such as, but not limited to, vibration signals, sound signals, etc. The command translation module 156 may translate the route commands into a generic protocol based on several factors such as, but not limited to, navigational directions, and distance, etc. The generic protocol may be, for example, {"Action":"Values, Left, Right, Slight Left, Slight Right, U-Turn, etc.", "DistanceToAction":"Numeric value in meters" }. In an example embodiment, the command translation module 156 may translate the route commands associated with the selected route into haptic command signals, e.g. vibration signals. For example, the command translation module 156 may translate directional commands into vibration signals which vibrate the signal device 120 on the side corresponding to the directional command, i.e. right or left. Further, the command translation module 156 may translate distance commands into vibration signals which vibrate the signal device 120 at different frequencies and/or intensities based on the distance until action should be taken to follow the command. For example, the command translation module 156 may translate route commands as follows:

Right, 100 meters→Vibrate Signal Device 120 Right @ 20 Hz
Left, 100 meters→Vibrate Signal Device 120 Left @ 20 Hz
Left, 10 meters→Vibrate Signal Device 120 Left @ 50 Hz
Left, 1 meter→Vibrate Signal Device 120 Left @ 100 Hz
U-Turn, 0 meters→Vibrate Signal Device 120 Left and Right @ 100 Hz.

In an embodiment, the frequencies may be frequencies in a range perceptible to a service animal but not perceptible to a human, e.g., 23,000-45,000 Hz. In another embodiment, the command translation module 156 may translate the route commands associated with the selected route into sound signals such as, but not limited to, direction words, e.g. "Right", "Left", "Stop", "U-Turn", or tones, etc. In another embodiment, the command translation module 156 may determine to not translate or filter out some route commands, for example, filtering out "Left, 100 meters" and "Left, 10 meters" in above example. Filtering out some route commands may be done to avoid service animal confusion, e.g. receiving three different "left" route commands for the same turn but at different distance intervals.

The command transmission module 158 transmits the translated service animal command signals from the user device 110 to the signal output unit 122 on the signal device 120 via the network 140. A translated service animal command signal may be transmitted in response to a determination that the user device is a particular location, e.g., a location along a route. The signal device 120 generates an output using the signal output unit 122 corresponding to the translated service animal command signals received from the user device 110. As discussed in the examples above, the signal output may be, but is not limited to, a haptic signal, e.g. vibration signal, or a sound signal, etc. The command transmission module 158 may transmit the service animal command signals as coded signals to be decoded by the signal device 120.

The command feedback/reinforcement module 160 detects service animal compliance with the service animal command signals. The command feedback/reinforcement module 160 may detect service animal compliance via the GPS or IPS location of the user device 110 or manually from the user using the signal control device 130. For example, the user device 110 may indicate that the user and the service animal have missed a service animal command signal and are no longer on the selected route based on a current location determined by a GPS or IPS component. As another example, the user may determine that the service animal has missed a service animal command signal and indicate non-compliance with the service animal command signal using the signal control device 130. If the command feedback/reinforcement module 160 detects that the service animal has followed a service animal command signal correctly, the service animal navigation program 112 may transmit the next service animal command signal. If the command feedback/reinforcement module 160 detects that the service animal has followed a service animal command signal incorrectly, the command feedback/reinforcement module 160 may alert the user of the non-compliance. The command feedback/reinforcement module 160 may further determine the cause of the service animal non-compliance. For example, but not limited to, the command feedback/reinforcement module 160 may identify a temporarily blocked or unavailable path using a camera or imaging sensor in the user device 110. Further, the command feedback/reinforcement module 160 may determine if such non-compliance is excused based on the determined cause. For example, if a path is determined to be blocked, e.g. under construction, the command feedback/reinforcement module 160 would determine that the service animal non-compliance is excused, i.e. for good reason and the service animal navigation program 112 would proceed to re-route and transmit the next service animal command. The command feedback/reinforcement module 160 may receive a reinforcement command signal from a user via the signal control device 130 and transmit the reinforcement command signal to the signal device 120. The reinforcement command signal may be a stronger service animal command signal than originally transmitted to the signal device 120. For example, if the original service animal command signal was a 100 hz vibration on the right side of the signal device 120, the reinforcement command signal may be a 200 Hz vibration on the right side of the signal device 120. The command feedback/reinforcement module 160 thus allows for users to communicate with their service animals without using speech.

Figure 2A:
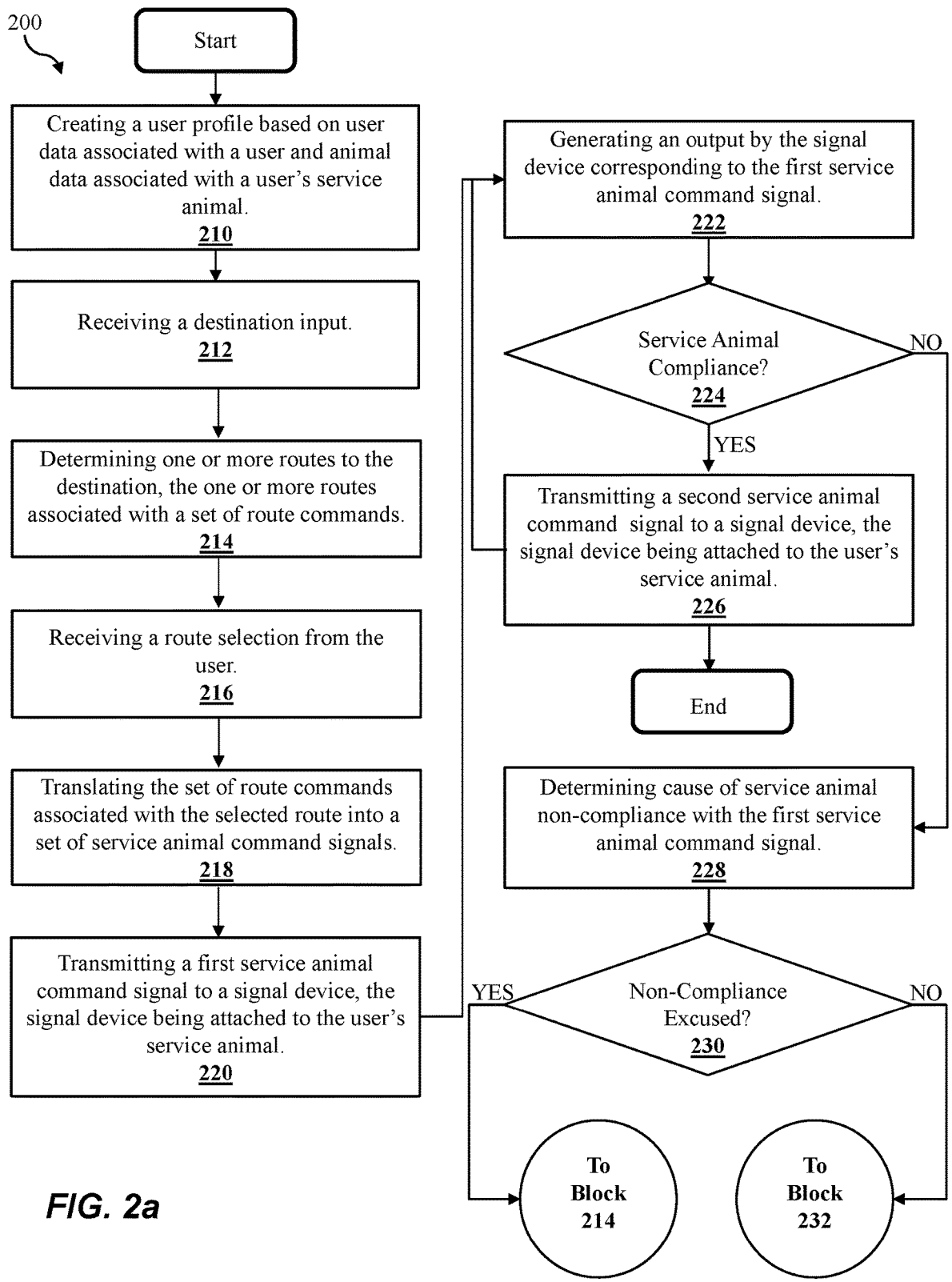
FIG. 2a is a flowchart illustrating an example method of the service animal navigation system, in accordance with an embodiment of the invention.
Figure 2B:
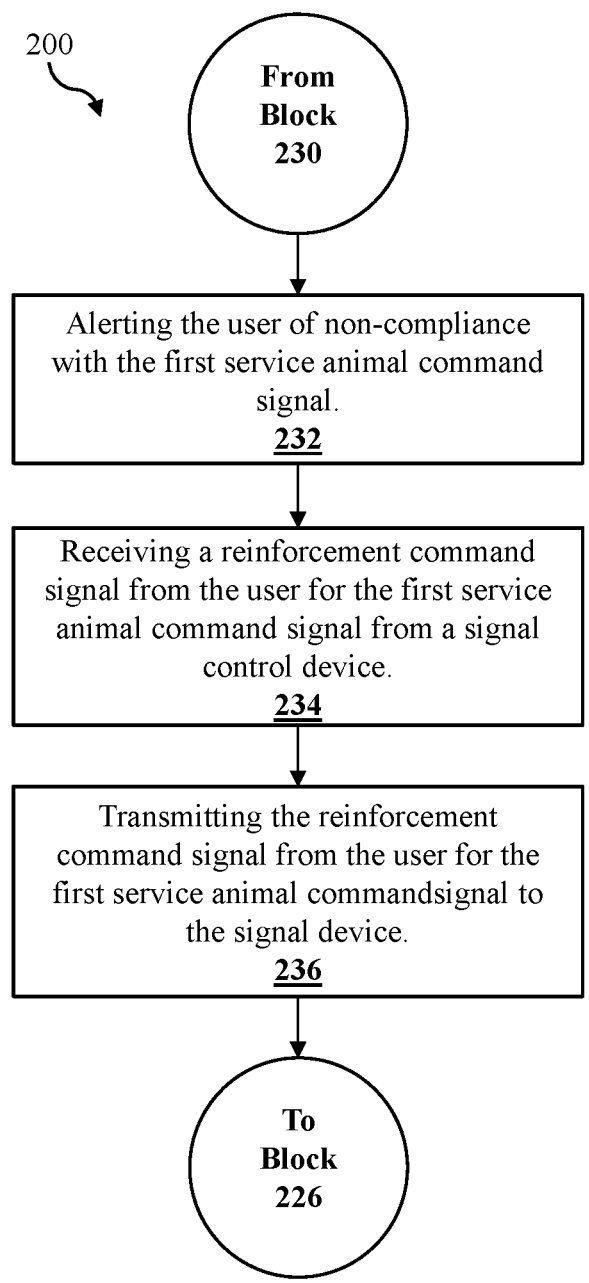
FIG. 2b is a flowchart illustrating an example method of the service animal navigation system, in accordance with an embodiment of the invention.

Referring to FIGS. 2a-2b, a method 200 for service animal navigation is depicted, in accordance with an embodiment of the present invention.

Referring to block 210, the service animal navigation program 112 creates a user profile based on the user data 115 and the animal data 119. User profile creation is described in more detail above with reference to the user profile module 150.

Referring to block 212, the service animal navigation program 112 receives a destination input. Destination input is described in more detail above with reference to the destination input module 152.

Referring to block 214, the service animal navigation program 112 determines one or more routes to the input destination utilizing the program data 115 stored on the program datastore 114. The one or more routes including one or more route commands, i.e. directions. Route determination is described in more detail above with reference to the route determination module 154.

Referring to block 216, the service animal navigation program 112 receives a route selection. Route selection is described in more detail above with reference to the route determination module 154.

Referring to block 218, the service animal navigation program 112 translates the route commands associated with the selected route into service animal command signals. Route command translation is described in more detail above with reference to the command translation module 156.

Referring to block 220, the service animal navigation program 112 transmits a first service animal command signal from the user device 110 to the signal output unit 122 on the signal device 120 via the network 140. Service animal command signal transmission is described in more detail above with reference to the command transmission module 158.

Referring to block 222, the signal device 120 generates an output corresponding to the first service animal command signal. Output generation is described in more detail above with reference to the command transmission module 158.

Referring to block 224, the service animal navigation program 112 detects service animal compliance with the first service animal command signal. Service animal compliance detection is described in more detail above with reference to the command feedback/reinforcement module 160. If the service animal navigation program 112 detects the service animal has complied with the first service animal command signal, the service animal navigation program 112 proceeds to block 226. If the service animal navigation program 112 detects the service animal has not complied with the first service animal command signal, the service animal navigation program 112 proceeds to block 228.

Referring to block 226, the service animal navigation program 112 transmits a second service animal command signal from the user device 110 to the signal output unit 122 on the signal device 120 via the network 140. Service animal command signal transmission is described in more detail above with reference to the command transmission module 158.

The service animal navigation program 112 may repeat blocks 222-226 until all service animal command signals associated with the selected route have been transmitted to the signal device 120.

Referring to block 228, the service animal navigation program 112 determines the cause of the service animal non-compliance. Non-compliance determination is described in more detail above with reference to the command feedback/reinforcement module 160.

Referring to block 230, the service animal navigation program 112 determines if the service animal non-compliance is excused. Service animal non-compliance determination is described in more detail above with reference to the command feedback/reinforcement module 160. If the service animal non-compliance is excused, the service animal navigation program 112 may proceed to block 214 to determine a new route to the input destination. If the service animal non-compliance is not excused, the service animal navigation program 112 may proceed to block 232.

Referring to block 232, the service animal navigation program 112 alerts the user of non-compliance with the first service animal command signal. Alert of service animal non-compliance is described in more detail above with reference to the command feedback/reinforcement module 160.

Referring to block 234, the service animal navigation program 112 receives a reinforcement command signal from the user for the first service animal command from the signal control device 130. Service animal command signal reinforcement is described in more detail above with reference to the command feedback/reinforcement module 160.

Referring to block 236, the service animal navigation program 112 transmits the reinforcement command signal to the signal control device 120. Reinforcement command signal transmission is described in more detail above with reference to the command feedback/reinforcement module 160.

The service animal navigation program 112 may repeat blocks 222-232 until all service animal command signals associated with the selected route have been transmitted to the signal device 120.

Figure 3:
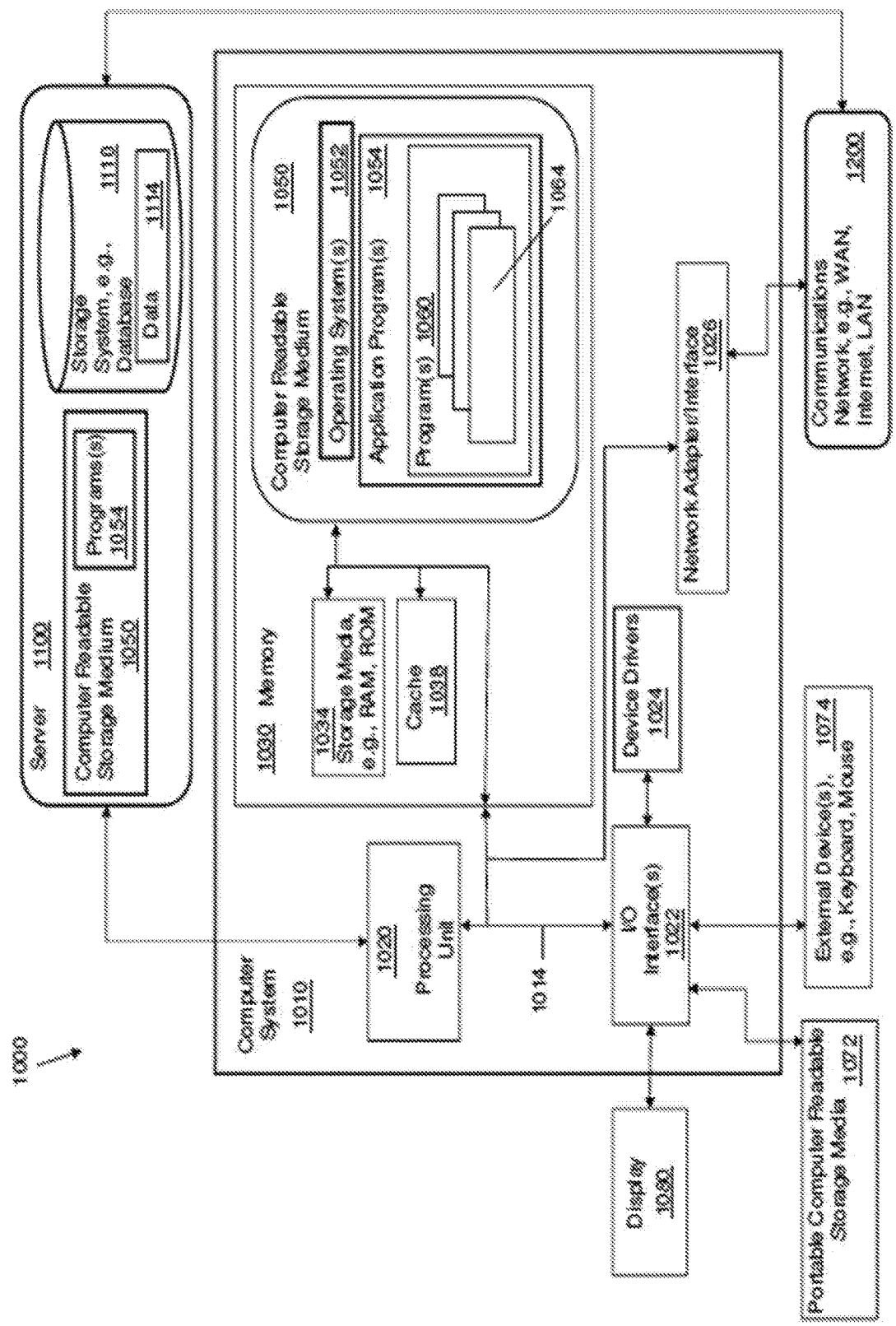
FIG. 3 is a block diagram depicting the hardware components of the service animal navigation management system of FIG. 1, in accordance with an embodiment of the invention.

Referring to FIG. 3, a system 1000 includes a computer system or computer 1010 shown in the form of a generic computing device. The method 200, for example, may be embodied in a program(s) 1060 (FIG. 3) embodied on a computer readable storage device, for example, generally referred to as memory 1030 and more specifically, computer readable storage medium 1050 as shown in FIG. 3. For example, memory 1030 can include storage media 1034 such as RAM (Random Access Memory) or ROM (Read Only Memory), and cache memory 1038. The program 1060 is executable by the processing unit or processor 1020 of the computer system 1010 (to execute program steps, code, or program code). Additional data storage may also be embodied as a database 1110 which can include data 1114. The computer system 1010 and the program 1060 shown in FIG. 3 are generic representations of a computer and program that may be local to a user, or provided as a remote service (for example, as a cloud based service), and may be provided in further examples, using a website accessible using the communications network 1200 (e.g., interacting with a network, the Internet, or cloud services). It is understood that the computer system 1010 also generically represents herein a computer device or a computer included in a device, such as a laptop or desktop computer, etc., or one or more servers, alone or as part of a datacenter. The computer system can include a network adapter/interface 1026, and an input/output (I/O) interface(s) 1022. The I/O interface 1022 allows for input and output of data with an external device 1074 that may be connected to the computer system. The network adapter/interface 1026 may provide communications between the computer system a network generically shown as the communications network 1200.

The computer 1010 may be described in the general context of computer system-executable instructions, such as program modules, being executed by a computer system. Generally, program modules may include routines, programs, objects, components, logic, data structures, and so on that perform particular tasks or implement particular abstract data types. The method steps and system components and techniques may be embodied in modules of the program 1060 for performing the tasks of each of the steps of the method and system. The modules are generically represented in FIG. 3 as program modules 1064. The program 1060 and program modules 1064 can execute specific steps, routines, sub-routines, instructions or code, of the program.

The method of the present disclosure can be run locally on a device such as a mobile device, or can be run a service, for instance, on the server 1100 which may be remote and can be accessed using the communications network 1200. The program or executable instructions may also be offered as a service by a provider. The computer 1010 may be practiced in a distributed cloud computing environment where tasks are performed by remote processing devices that are linked through a communications network 1200. In a distributed cloud computing environment, program modules may be located in both local and remote computer system storage media including memory storage devices.

More specifically, as shown in FIG. 3, the system 1000 includes the computer system 1010 shown in the form of a general-purpose computing device with illustrative periphery devices. The components of the computer system 1010 may include, but are not limited to, one or more processors or processing units 1020, a system memory 1030, and a bus 1014 that couples various system components including system memory 1030 to processor 1020.

The bus 1014 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1010 can include a variety of computer readable media. Such media may be any available media that is accessible by the computer 1010 (e.g., computer system, or server), and can include both volatile and non-volatile media, as well as, removable and non-removable media. Computer memory 1030 can include additional computer readable media 1034 in the form of volatile memory, such as random access memory (RAM), and/or cache memory 1038. The computer 1010 may further include other removable/non-removable, volatile/non-volatile computer storage media, in one example, portable computer readable storage media 1072. In one embodiment, the computer readable storage medium 1050 can be provided for reading from and writing to a non-removable, non-volatile magnetic media. The computer readable storage medium 1050 can be embodied, for example, as a hard drive. Additional memory and data storage can be provided, for example, as the storage system 1110 (e.g., a database) for storing data 1114 and communicating with the processing unit 1020. The database can be stored on or be part of a server 1100. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1014 by one or more data media interfaces. As will be further depicted and described below, memory 1030 may include at least one program product which can include one or more program modules that are configured to carry out the functions of embodiments of the present invention.

The method 200 (FIGS. 2a-2b), for example, may be embodied in one or more computer programs, generically referred to as a program(s) 1060 and can be stored in memory 1030 in the computer readable storage medium 1050. For example, the program 1060 can include the modules 150-160 described above with reference to FIG. 1b. The program modules 1064 can generally carry out functions and/or methodologies of embodiments of the invention as described herein. The one or more programs 1060 are stored in memory 1030 and are executable by the processing unit 1020. By way of example, the memory 1030 may store an operating system 1052, one or more application programs 1054, other program modules, and program data on the computer readable storage medium 1050. It is understood that the program 1060, and the operating system 1052 and the application program(s) 1054 stored on the computer readable storage medium 1050 are similarly executable by the processing unit 1020.

The computer 1010 may also communicate with one or more external devices 1074 such as a keyboard, a pointing device, a display 1080, etc.; one or more devices that enable a user to interact with the computer 1010; and/or any devices (e.g., network card, modem, etc.) that enables the computer 1010 to communicate with one or more other computing devices. Such communication can occur via the Input/Output (I/O) interfaces 1022. Still yet, the computer 1010 can communicate with one or more networks 1200 such as a local area network (LAN), a general wide area network (WAN), and/or a public network (e.g., the Internet) via network adapter/interface 1026. As depicted, network adapter 1026 communicates with the other components of the computer 1010 via bus 1014. It should be understood that although not shown, other hardware and/or software components could be used in conjunction with the computer 1010. Examples, include, but are not limited to: microcode, device drivers 1024, redundant processing units, external disk drive arrays, RAID systems, tape drives, and data archival storage systems, etc.

It is understood that a computer or a program running on the computer 1010 may communicate with a server, embodied as the server 1100, via one or more communications networks, embodied as the communications network 1200. The communications network 1200 may include transmission media and network links which include, for example, wireless, wired, or optical fiber, and routers, firewalls, switches, and gateway computers. The communications network may include connections, such as wire, wireless communication links, or fiber optic cables. A communications network may represent a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. A network may also include a number of different types of networks, such as, for example, an intranet, a local area network (LAN), or a wide area network (WAN).

In one example, a computer can use a network which may access a website on the Web (World Wide Web) using the Internet. In one embodiment, a computer 1010, including a mobile device, can use a communications system or network 1200 which can include the Internet, or a public switched telephone network (PSTN) for example, a cellular network. The PSTN may include telephone lines, fiber optic cables, microwave transmission links, cellular networks, and communications satellites. The Internet may facilitate numerous searching and texting techniques, for example, using a cell phone or laptop computer to send queries to search engines via text messages (SMS), Multimedia Messaging Service (MMS) (related to SMS), email, or a web browser. The search engine can retrieve search results, that is, links to websites, documents, or other downloadable data that correspond to the query, and similarly, provide the search results to the user via the device as, for example, a web page of search results.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
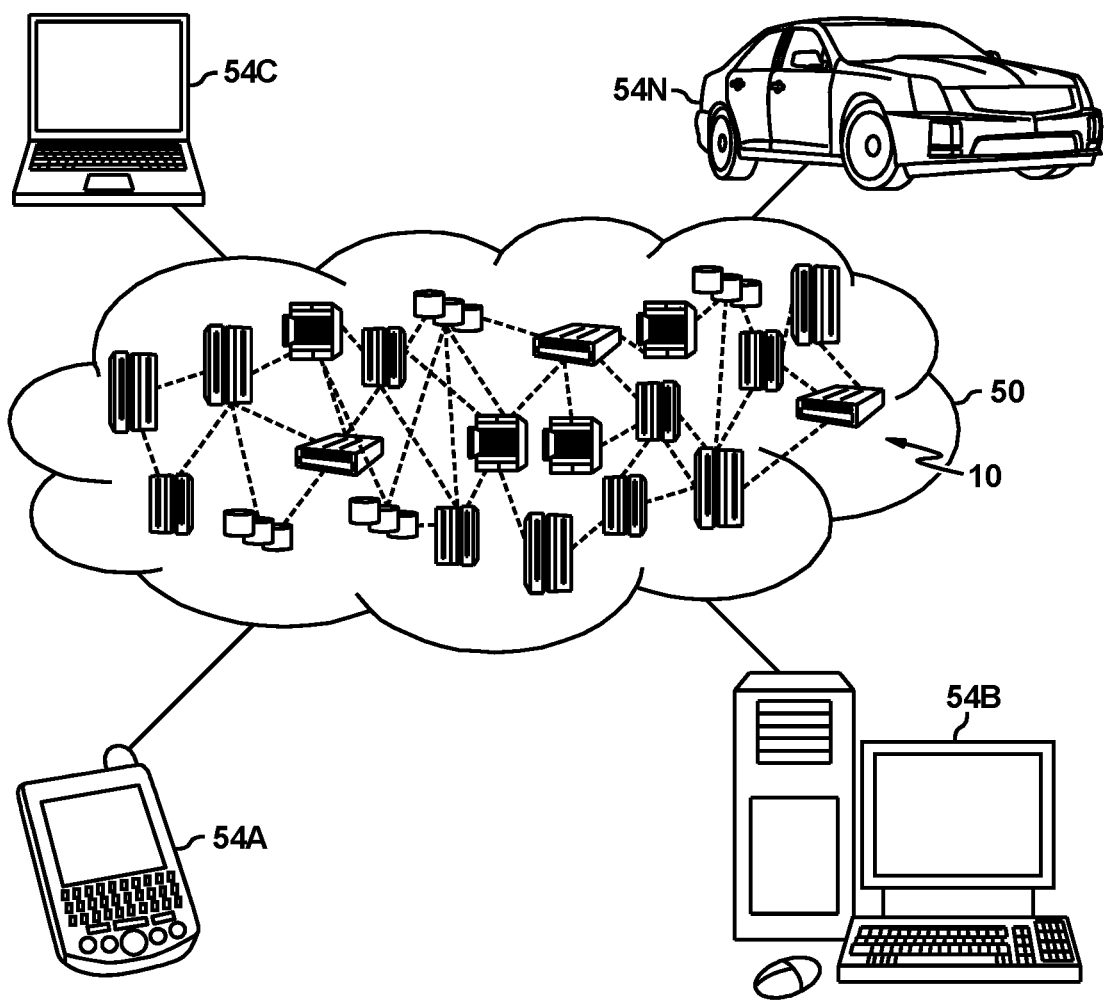
FIG. 4 illustrates a cloud computing environment, in accordance with an embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
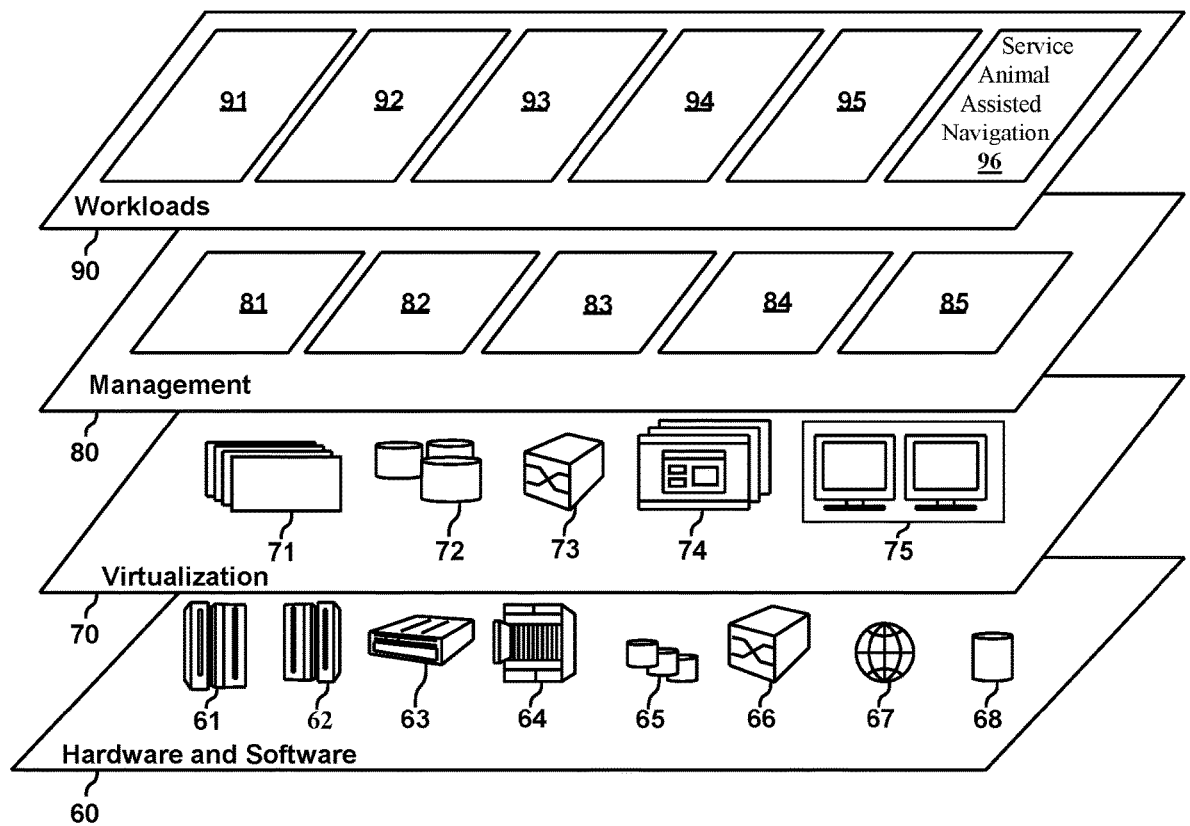
FIG. 5 illustrates a set of functional abstraction layers provided by the cloud computing environment of FIG. 4, in accordance with an embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service animal navigation 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

What is claimed is:

1. A method for service animal navigation, the method comprising:
    creating, by a computing device, a user profile based on user data associated with a user and animal data associated with a user's service animal;
    receiving, by the computing device, a destination input;
    determining, by the computing device, one or more routes to the input destination, the one or more routes each being associated with a set of route commands;
    receiving, by the computing device, a route selection;
    translating, by the computing device, the set of route commands associated with the selected route into a set of service animal command signals;
    transmitting, by the computing device, a first service animal command signal from the set of service animal command signals to a signal device, the signal device being attached to the user's service animal; and
    in response to receiving the first service animal command signal, generating, an output by the signal device corresponding with the first service animal command signal.

2. The method of claim 1, further comprising:
    detecting, by the computing device, service animal compliance with the first service animal command signal; and
    in response to detecting non-compliance by the service animal with the first service animal command signal, alerting, by the computing device, the user of the non-compliance by the service animal with the first service animal command signal.

3. The method of claim 2, further comprising:
    receiving, by the computing device, a reinforcement command signal from the user for the first service animal command signal from a signal control device; and
    transmitting, by the computing device, the reinforcement command signal to the signal device for output to the service animal.

4. The method of claim 2, further comprising:
    determining, by the computing device, a cause of the non-compliance of the service animal;
    in response to determining a valid cause of the non-compliance of the service animal, determining, by the computing device, a new route to the input destination.

5. The method of claim 1, wherein the animal data comprises one or more of a group comprising: service animal identification data, service animal command preferences, and identification data for signal devices associated with the service animal.

6. The method of claim 1, wherein the service animal command signals are haptic signals.

7. The method of claim 1, wherein the signal device comprises one or more of a group consisting of: a haptics device, a sound device, a pressure device, and a vibration device.

8. A computer program product for service animal navigation, the computer program product embodied in a non-transitory computer readable storage medium comprising:
    the non-transitory computer readable storage medium having program instructions embodied therewith, the program instructions executable by a computer to cause the computer to perform a method, comprising:
    creating, by a computing device, a user profile based on user data associated with a user and animal data associated with a user's service animal;
    receiving, by the computing device, a destination input;
    determining, by the computing device, one or more routes to the input destination, the one or more routes each being associated with a set of route commands;
    receiving, by the computing device, a route selection;
    translating, by the computing device, the set of route commands associated with the selected route into a set of service animal command signals;
    transmitting, by the computing device, a first service animal command signal from the set of service animal command signals to a signal device, the signal device being attached to the user's service animal; and
    in response to receiving the first service animal command signal, generating, an output by the signal device corresponding with the first service animal command signal.

9. The computer program product comprising the non-transitory computer-readable storage medium of claim 8, further comprising:
    detecting, by the computing device, service animal compliance with the first service animal command signal; and
    in response to detecting non-compliance by the service animal with the first service animal command signal, alerting, by the computing device, the user of the non-compliance by the service animal with the first service animal command signal.

10. The computer program product comprising the non-transitory computer-readable storage medium of claim 9, further comprising:
    receiving, by the computing device, a reinforcement command signal from the user for the first service animal command signal from a signal control device; and
    transmitting, by the computing device, the reinforcement command signal to the signal device for output to the service animal.

11. The computer program product comprising the non-transitory computer-readable storage medium of claim 9, further comprising:
    determining, by the computing device, a cause of the non-compliance of the service animal;
    in response to determining a valid cause of the non-compliance of the service animal, determining, by the computing device, a new route to the input destination.

12. The computer program product comprising the non-transitory computer-readable storage medium of claim 8, wherein the animal data comprises one or more of a group comprising: service animal identification data, service animal command preferences, and identification data for signal devices associated with the service animal.

13. The computer program product comprising the non-transitory computer-readable storage medium of claim 8, wherein the service animal command signals are haptic signals.

14. The computer program product comprising the non-transitory computer-readable storage medium of claim 8, wherein the signal device comprises one or more of a group consisting of: a haptics device, a sound device, a pressure device, and a vibration device.

15. A system for service animal navigation, the system comprising:
   a computer system comprising, a processor, a computer readable storage medium, and program instructions stored on the computer readable storage medium being executable by the processor to cause the computer system to:
   create, by a computing device, a user profile based on user data associated with a user and animal data associated with a user's service animal;
   receive, by the computing device, a destination input;
   determine, by the computing device, one or more routes to the input destination, the one or more routes each being associated with a set of route commands;
   receive, by the computing device, a route selection;
   translate, by the computing device, the set of route commands associated with the selected route into a set of service animal command signals;
   transmit, by the computing device, a first service animal command signal from the set of service animal command signals to a signal device, the signal device being attached to the user's service animal; and
   in response to receiving the first service animal command signal, generate, an output by the signal device corresponding with the first service animal command signal.

16. The system of claim 15, further comprising program instructions to:
   detect, by the computing device, service animal compliance with the first service animal command signal; and
   in response to detecting non-compliance by the service animal with the first service animal command signal, alert, by the computing device, the user of the non-compliance by the service animal with the first service animal command signal.

17. The system of claim 16, further comprising program instructions to:
   receive, by the computing device, a reinforcement command signal from the user for the first service animal command signal from a signal control device; and
   transmit, by the computing device, the reinforcement command signal to the signal device for output to the service animal.

18. The system of claim 16, further comprising program instructions to:
   determine, by the computing device, a cause of the non-compliance of the service animal;
   in response to determining a valid cause of the non-compliance of the service animal, determine, by the computing device, a new route to the input destination.

19. The method of system 15, wherein the service animal command signals are haptic signals.

20. The system of claim 15, wherein the signal device comprises one or more of a group consisting of: a haptics device, a sound device, a pressure device, and a vibration device.

* * * * *